US011355125B2

(12) United States Patent
Carbune et al.

(10) Patent No.: US 11,355,125 B2
(45) Date of Patent: Jun. 7, 2022

(54) CAPTCHA AUTOMATED ASSISTANT

(71) Applicant: Google LLC, Mountain View, CA (US)

(72) Inventors: Victor Carbune, Winterthur (CH); Pedro Gonnet Anders, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 179 days.

(21) Appl. No.: 16/618,589

(22) PCT Filed: Aug. 6, 2018

(86) PCT No.: PCT/US2018/045381
§ 371 (c)(1),
(2) Date: Dec. 2, 2019

(87) PCT Pub. No.: WO2020/032919
PCT Pub. Date: Feb. 13, 2020

(65) Prior Publication Data
US 2020/0342879 A1    Oct. 29, 2020

(51) Int. Cl.
*G10L 17/04* (2013.01)
*G06F 21/31* (2013.01)
*G10L 17/22* (2013.01)

(52) U.S. Cl.
CPC .............. *G10L 17/04* (2013.01); *G06F 21/31* (2013.01); *G10L 17/22* (2013.01); *G06F 2221/2133* (2013.01)

(58) Field of Classification Search
CPC ...... G06N 3/0454; G06N 3/0445; G06N 3/08; G06N 20/00; G06N 7/005; G06N 5/02; G06N 3/088; G06N 3/02; G06K 9/6267; G06K 9/623; G06K 9/4676; G06K 9/6218; G06K 9/00288; G06K 9/00899; G06K 9/628; G06K 9/6284; G06F 40/30;
(Continued)

(56) References Cited
U.S. PATENT DOCUMENTS 7,945,952 B1   5/2011 Behforooz
8,494,854 B2   7/2013 Gross
(Continued)

OTHER PUBLICATIONS

Li et al, Adversarial Learning for Neural Dialogue Generation, https://arxiv.org/pdf/1701.06547v4.pdf, 13 pages, Jan. 23, 2017 (Year: 2017).*
(Continued)

*Primary Examiner* — Linda Wong
(74) *Attorney, Agent, or Firm* — Middleton Reutlinger

(57) ABSTRACT

Implementing and applying an adaptive and self-training CAPTCHA ("Completely Automated Public Turing test to tell Computers and Humans Apart") assistant that distinguishes between a computer-generated communication (e.g., speech and/or typed) and communication that originates from a human. The CAPTCHA assistant utilizes a generative adversarial network that is self-training and includes a generator to generate synthetic answers and a discriminator to distinguish between human answers and synthetic answers. The trained discriminator is applied to potentially malicious remote entities, which are provided challenge phrases. Answers from the remote entities are provided to the discriminator to predict whether the answer originated from a human or was computer-generated.

17 Claims, 8 Drawing Sheets

(58) Field of Classification Search
CPC .......... G06F 17/16; G06F 40/56; G06F 30/27;
G06F 40/20; G06F 40/35; G06F 16/243;
G06F 16/24522; G06F 16/24578; G06F
16/3329; G06F 16/90332; G06F
2221/2133; G06F 40/211; G06F 40/279;
G06F 40/284; G06F 16/248; G06F
16/285; G06F 11/30; G06F 16/2433;
G10L 15/22; G10L 15/26; G10L 15/063;
G10L 15/16; G10L 15/18; G10L 13/00;
G10L 13/027; G10L 13/047; G10L 17/04;
G10L 17/18
See application file for complete search history.

(56) References Cited

U.S. PATENT DOCUMENTS

| | | | |
|---|---|---|---|
| 8,556,727 B2 | 10/2013 | Kim et al. | |
| 2009/0055193 A1 | 2/2009 | Maislos et al. | |
| 2013/0218566 A1 | 8/2013 | Qian et al. | |
| 2018/0004921 A1 | 1/2018 | McInerny et al. | |
| 2021/0117733 A1* | 4/2021 | Mahto | G06K 9/6264 |

OTHER PUBLICATIONS

Olabiyi, O. et al, Multi-turn dialogue response generation in an adversarial learning framework, https://arxiv.org, 10 pages, May 30, 2018 (Year: 2018).*

Wu et al, Are you talking to me? Reasoned visual dialog generation through adversarial learning, https://ieeexplore.ieee.org/document/8578737?source=IQplus, 10 pages, Jun. 18-23, 2018 (Year: 2018).*

Rao et al, Answer based Adversarial Training for Generating Clarification Questions, https://arxiv.org/abs/1904.02281, 14 pages, Apr. 4, 2019 (Year: 2019).*

Li, J. et al. "Adversarial Learning for Neural Dialogue Generation;" retrieved from internet: URL/https://arxiv.org/pdf/1701.06547v4.pdf; 13 pages; Jan. 23, 2017.

Olabiyi, O. et al. "Multi-turn dialogue Response Generation in an Adversarial Learning Framework;" arxiv.org; 10 pages; May 30, 2018.

European Patent Office; International Search Report and Written Opinion issued in Application No. PCT/US2018/045381; 15 pages; dated Apr. 8, 2019.

Mirza, M. et al. "Conditional Generative Adversarial Nets;" arXiv.org; arXiv:1411.1784v1; 7 pages; dated Nov. 6, 2014.

Douzas, G. et al. "Effective Data Generation for Imbalanced Learning Using Conditional Generative Adversarial Networks;" Elsevier; Expert Systems with Applications; www.elsevier.com/locate/eswa; vol. 91; pp. 464-471; Jan. 2018.

Wang, B. et al. "Conditional Generative Adversarial Networks for Commonsense Machine Comprehensio;" Proceedings of the 26th International Joint Conference on Artificial Intelligence; Melbourne, Australia; pp. 4123-4129; Aug. 2017.

Shrivastava, A. et al. "Learning from Simulated and Unsupervised Images through Adversarial Training;" arXiv.org; arXiv:1612.07828v1; 16 pages; Dec. 22, 2016.

Gao, Y. et al. "Voice Impersonation Using Generative Adversarial Networks;" arXiv.org; arXiv:1802.06840v1; 5 pages; Feb. 19, 2018.

Hasan, W. "A Survey of Current Research on CAPTCHA;" International Journal of Computer Science & Engineering Survey (IJCSES) vol. 7, No. 3.; 21 pages; Jun. 2016.

Donahue, C. et al. "Synthesizing Audio with Generative Adversarial Networks;" arXiv.org; arXiv:1802.04208v1; 11 pages; Feb. 12, 2018.

* cited by examiner

CAPTCHA AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "virtual assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text (or other semantic representation) and then processed. Also, for example, users can additionally or alternatively provide requests by providing textual (e.g., typed) natural language input. An automated assistant responds to a request by providing responsive user interface output, which can include audible and/or visual user interface output.

As mentioned above, many automated assistants are configured to be interacted with via spoken utterances. Spoken utterances are received at a client device via one or more microphones of the client device. For example, each microphone of the client device generates a corresponding audio signal that varies over time in dependence on sound(s) detected at the microphone. The audio signal(s) received via the microphone can be processed (at the client device and/or remote server device(s)) for one or more purposes, such as automatic speech recognition (e.g., converting audio signal(s) to text, phoneme(s), and/or other semantic representation).

The client device(s) via which a user interacts with an automated assistant includes an assistant interface that provides, to a user of the client device, an interface for interacting with the automated assistant (e.g., receives spoken and/or typed input from the user, and provides appropriate audible and/or graphical responses), and that interfaces with one or more additional components that implement the automated assistant (e.g., remote server device(s) that process user inputs and generate appropriate responses).

As interactions between automated assistants and humans become more frequent and sophisticated, malicious entities ("spammers") are more and more likely to generate malicious software agents that mimic human beings during human-to-computer dialogs. These malicious software agents, or "spam bots," interrupt the intended flow of requests and responses between the assistant and human for malicious and/or disruptive purposes. For example, an automated assistant may be tasked with contacting and communicating with a human (e.g., by telephone) to perform a task, but the automated assistant may instead be connected to a spam bot. The resulting communication may be with a spam bot and not with an actual human, as intended and expected. A spammer may utilize such a spam bot to interfere with the intended communication between an automated assistant and a human agent. As another example, a spam bot may be programmed to initiate a dialog with an automated assistant that is tasked with scheduling bookings for a particular service (e.g., haircut, massage, manicure, etc.), e.g., so that the spam bot (which could be deployed, for instance, by a competitor) can create fake appointments to disrupt a business that deployed the automated assistant.

CAPTCHA ("Completely Automated Public Turing test to tell Computers and Humans Apart") assistants may be utilized to distinguish between a computer-generated communication (e.g., speech and/or typed) and communication that originates from a human. For example, an automated assistant configured with CAPTCHA capabilities can interact with a remote entity that is supposed to be a human but is potentially a spam bot. The CAPTCHA-equipped automated assistant can determine, based on the interactions, a likelihood that the response is from a computer rather than a human. If a human is expected and the CAPTCHA assistant determines the source is a computer, the source may be flagged as a potential spam bot.

SUMMARY

Because spam bots interrupt the expected flow of requests and responses, significant computing time is wasted with interactions with unwanted assistants. Further, spammers can improve the sophistication of bots as the bots are identified and blocked. Accordingly, implementations disclosed herein are directed to implementing an adaptive CAPTCHA ("Completely Automated Public Turing test to tell Computers and Humans Apart") assistant that distinguishes between a computer-generated communication (e.g., speech and/or typed) and communication that originates from a human.

In some implementations, one or more components of one or more generative adversarial networks ("GANs") may be trained to interact with a remote entity to predict whether the remote entity is a human, as expected, or a spam bot that is attempting to mimic a human. The CAPTCHA-equipped automated assistant may utilize challenge phrases that may be provided to the remote entity and determine whether response(s) from the remote entity are computer-generated or human-generated. For example, the automated assistant may provide a question to the remote entity that is likely to be processed without issue by a spam bot but that would confuse a human. The automated assistant can determine a likelihood of the remote entity being a computer or a human based on the response. Also, for example, the automated assistant may provide a challenge phrase that a human would be likely to process but that a computer would not be likely to meaningfully process, and based on the response from the remote entity, determine whether the remote entity is a computer or a human.

A GAN is comprised of a generator and a discriminator. Both the generator and the discriminator may be machine learning models, such as neural networks (e.g., feed-forward, recurrent, etc.), and may be trained in tandem. During training, the generator generates synthetic output based on one or more inputs and provides the synthetic output to the discriminator. The discriminator receives, as labeled training examples, the synthetic output and separate non-synthetic human output (e.g., ground truth data, human-generated data, etc.). The discriminator is applied to generate a prediction of whether each training example was generated by a computer or by a human. A label associated with each training example (e.g., which labels the example as synthetic or human-generated) is then compared with the corresponding output generated by the discriminator. Based on this comparison, various training techniques such as back propagation and gradient descent may be applied to train both the discriminator and the generator in tandem. Once fully trained, the generator may be optimized to provide output that is virtually indistinguishable as human- or computer-generated by the discriminator, and the discriminator may be optimized to distinguish human output from computer output.

In the context of the current disclosure, in some implementations, textual challenge phrases are applied as input across a first generator (herein referred to as an answer generator or "A-Generator"). The A-Generator generates synthetic answers that are labeled as "computer generated." The labelled synthetic answers are applied as input across a first discriminator (herein referred to as the answer discriminator or A-Discriminator), in some cases along with the associated textual challenge phrase, and the A-discriminator generates output that predicts whether the synthetic answer originated from the A-generator or a human. Further, the A-Discriminator is provided human answers to textual challenge phrases (labelled as "human generated") and determines whether the human answers originated from a human or computer. A difference (or "error") between the labels and the A-discriminator's output may be used to train both the A-discriminator and the A-generator, as described previously.

The A-Generator can generate synthetic answers to textual challenge phrases that it receives as input. In some implementations, the textual challenge phrases may be associated with a known human answer and the A-Generator may modify the known human answer. For example, the A-Generator may further include as input a random noise vector that is utilized to modify the known human answer and provide the modified known human answer as a synthetic answer to a given textual challenge phrase.

In some implementations, a second GAN may be utilized to generate the textual challenge phrases. The second GAN can include a second generator (hereinafter referred to as the challenge generator or "C-Generator") which receives textual requests as input and generates textual challenge phrases. The textual challenge phrases may be, for example, textual requests modified to generate textual challenge phrases that are likely to elicit an answer from a remote entity that the A-Discriminator will correctly construe as originating from a human or from a computer. Also, for example, the C-Generator may utilize interactions between two humans and/or between a human and a known (e.g., trusted) automated assistant to generate potential textual challenge phrases. Also, for example, the C-Generator may generate textual challenge phrases that are based on known question forms that are likely to result in responses from humans that are identified as human and from computers that are likely to be identified as computer by the A-Discriminator.

The generated (i.e. synthetic) textual challenge phrases may be applied as input across a second discriminator (hereinafter referred to as the challenge discriminator or "C-Discriminator"), which may determine, for instance, whether the generated textual challenge phrase is useful in training the A-GAN (i.e., the A-Generator and the A-Discriminator). In some implementations, the C-Discriminator receives the generated textual challenge phrase and one or more additional inputs to determine whether the textual challenge phrase, if provided to a remote entity, will likely result in an answer from a human that is distinguishable as a human and/or a result from a computer that is distinguishable as a spam bot. For example, the C-Discriminator may receive an original textual request (e.g., the C-Generator input), a synthetic answer generated by the A-Generator based on a textual challenge phrase, and/or the output of the A-Discriminator in addition to the textual challenge phrase generated by the C-Generator to predict whether the textual challenge phrase may be useful in differentiating a human from a bot. As in the A-GAN, the C-Discriminator is trained to improve its prediction of whether a particular textual challenge phrase is useful based on whether the A-Discriminator predicts correctly or not. Thus, when trained in tandem with the C-Discriminator, the C-Generator is optimized to provide textual challenge phrases that are useful to provide to a potential bot agent in order to elicit a response that differentiates a human from a bot based on predictions made by the C-Discriminator.

The C-GAN and the A-GAN may be further trained and refined based on subsequent interactions between humans and assistants (spam bots, humans, and/or known approved assistants). Thus, due to the dynamic nature of the GANs, improved sophistication of spam bots can be met with improved sophistication of the CAPTCHA-equipped automated assistant in identifying the improved spam bots. Further, the CAPTCHA-equipped automated assistant requires minimal human intervention to train, resulting in an assistant that continuously evolves with the spam bots it is trying to identify.

In some implementations, the CAPTCHA-equipped automated assistant may be utilized as a layer in interactions between an automated assistant and a potential spam bot. For example, a user may submit a request to an automated assistant that requires the automated assistant to interact with a remote entity that is expected to be a human. The automated assistant may generate a textual request to provide to the remote entity and provide the request. The remote entity may then provide an answer to the textual request and the answer may be provided to the trained A-Discriminator, which then can determine whether the answer was provided by a human or computer. One or more components may then utilize the A-Discriminator output to affect further interactions with the agent (e.g., label agent as spam, label agent as human, alter authentication parameters, determine that a confidence in the likelihood that the agent is human or computer is too low to confidently label the agent).

In some implementations, the C-Generator may independently generate a textual challenge phrase to provide to a remote entity and the remote entity's response may be provided to the A-Discriminator to determine whether the answer was more likely human or computer. Also, for example, the C-Generator may modify a textual request generated by an automated assistant in response to a user request and provide the modified textual request to the remote entity. Again, based on the response from the remote entity, the A-Discriminator may determine whether the answer was from a human or generated by a computer. Thus, the trained C-Generator may provide challenge phrases that are useful in differentiating between humans and bots and the A-Discriminator may determine, based on the remote entity's answers, if a human or computer provided the answer.

The above is provided as an overview of some implementations disclosed herein. Further description of these and other implementations is provided below.

In some implementations, a method performed by one or more processors is provided that includes: providing a plurality of textual challenge phrases, wherein each textual challenge phrase includes a challenge configured to elicit a response from a natural language dialog software agent; applying the plurality of textual challenge phrases as inputs across a first generator machine learning model to generate a respective plurality of synthetic answers, wherein each respective synthetic answer of the plurality of synthetic answers is responsive to the challenge included with the respective textual challenge; assigning each of the plurality of synthetic answers a label indicative of it being generated by a natural language dialog software agent; assigning each of a plurality of human-generated answers a label indicative of it being generated by a human; applying a plurality of answers as inputs across a first discriminator machine learning model to generate a respective plurality of CAPTCHA outputs, wherein each respective CAPTCHA output of the plurality of CAPTCHA outputs comprises a prediction of whether the respective answer of the plurality of answers was generated by the natural language dialog software agent or a human, and wherein the plurality of answers comprises the plurality of synthetic answers and the plurality of human-generated answers; and training the first generator and first discriminator machine learning models based on a comparison of the labels assigned to the plurality of answers with the plurality of CAPTCHA outputs.

These and other implementations of technology disclosed herein may optionally include one or more of the following features.

In various implementations, the method may further include applying a plurality of textual requests as input across a second generator machine learning model to generate, respectively, the plurality of textual challenge phrases. In various implementations, the plurality of textual requests may be configured to elicit a textual challenge phrase from a natural language dialog software agent. In various implementations, the second generator machine learning model may be trained in conjunction with a second discriminator machine learning model, and wherein the second discriminator machine learning model is configured to have the plurality of textual requests applied as input to generate output.

In various implementations, the first generator machine learning model may be a neural network. In various implementations, the first discriminator machine learning model may be a neural network. In various implementations, the first generator machine learning model may be conditioned on a noise vector. In various implementations, the first discriminator machine learning model may be conditioned on a noise vector.

In another aspect, a method implemented by one or more processors for using a completely automated public Turing test ("CAPTCHA") to determine whether an incoming communication from a remote entity is computer-generated or human-generated, may include: selecting a textual challenge phrase, wherein the textual challenge phrase is selected to elicit a response indicative of whether the remote entity is human or synthetic; providing the textual challenge phrase to the remote entity; receiving, in response to providing the textual challenge phrase, an answer from the remote entity; assigning data indicative of the answer as input across a discriminator machine learning model to generate a CAPTCHA prediction, wherein the discriminator machine learning model is trained to generate the CAPTCHA prediction by: providing the discriminator machine learning model with synthetic answers labelled as synthetic and human answers labelled as human, comparing CAPTCHA predictions output by the discriminator machine learning model with the labels, and training the discriminator machine learning model based on the comparing; determining, based on output generated by the discriminator machine learning model, a CAPTCHA prediction of whether the answer was computer-generated or human-generated; and classifying the remote entity as human or synthetic based on the CAPTCHA prediction.

In various implementations, the textual challenge phrase may be generated by a generator machine learning model. In various implementations, the generator machine learning model may be trained to generate textual challenges phrases that are configured to elicit answers that, when applied as input across the discriminator machine learning model, will cause the discriminator machine learning model to generate output that predicts whether the answers are human-generated or computer-generated. In various implementations, the method may further include: receiving a textual request, wherein the textual request is based on a user action of a user; applying the textual request as input across the generator machine learning model; and receiving the textual challenge phrase from the generator machine learning model, wherein the textual challenge phrase is based on the textual request.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
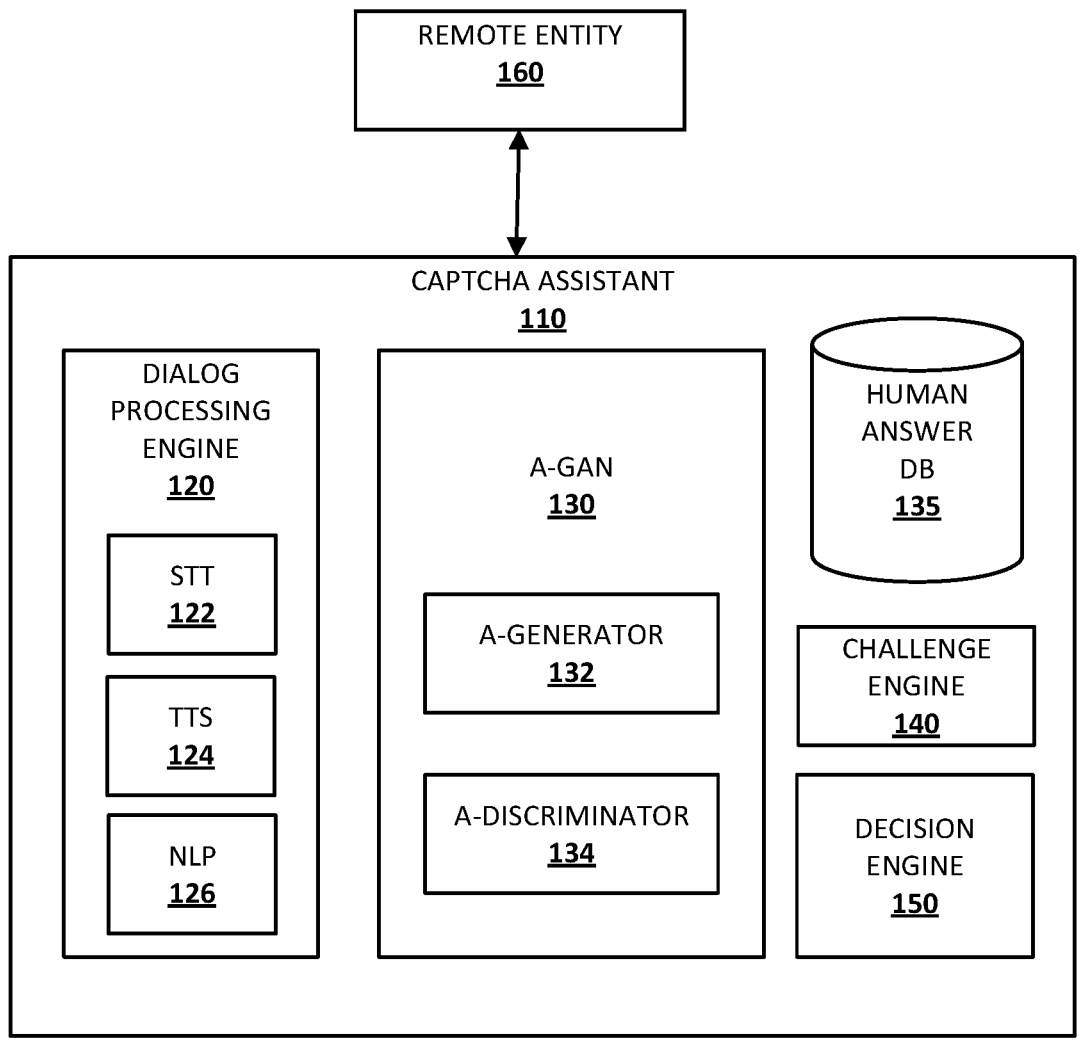
FIG. 1 is a block diagram of an example environment in which implementations disclosed herein can be implemented.

Now turning to FIG. 1, an example environment in which techniques disclosed herein can be implemented is illustrated. The example environment includes a CAPTCHA ("Completely Automated Public Turing test to tell Computers and Humans Apart") assistant 110 and a remote entity 160. Although CAPTCHA assistant 110 is illustrated in FIG. 1 as a single component, it is understood that one or more modules and/or aspects of the CAPTCHA assistant 110 can be implemented, in whole or in part, by one or more computing systems. For example, in some implementations a first set of modules and/or aspects are implemented by one or more processors of a remote system, and a second set of modules and/or aspects are implemented by one or more processors of one or more separate remote server device(s) that are in network communication with the CAPTCHA assistant 110. The remote server device(s) can be, for example, a cluster of high performance remote server device(s) that handle requests from one or more client devices, as well as requests from additional devices. For example, CAPTCHA assistant 110 may receive audio data that includes one or more requests from a client device and CAPTCHA assistant 110 may submit one or more commands and/or requests to remote entity 160. Similarly, remote entity 160 may provide audio data and/or other requests to CAPTCHA assistant 110, which may then process the audio data and/or requests and provide one or more additional requests and/or commands to a client device.

CAPTCHA assistant 110 includes a dialog processing engine 120 that facilitates human-to-computer dialog sessions with a user via user interface input and output devices of a client device and/or remote entity 160. One such example of an output device is speaker(s) of a client device, and one such example of a user interface input device is one or more microphones of the client device. For example, a user can provide user interface input directed to the CAPTCHA assistant 110 by speaking spoken utterances that are detected by one or more microphones of the client device as output. In some implementations, remote entity 160 may include a device, such as a telephone, that allows a user of the remote entity 160 to provide audio data to the CAPTCHA assistant 110. For example, CAPTCHA assistant 110 may initiate a communication channel with remote entity 160. The communication channel may be, for example, via cellular communication channels, voice over Internet communication, and/or other communication channels that allow CAPTCHA assistant 110 to send and receive audio communication data between one or more components of CAPTCHA assistant 110 and the remote entity 160.

The dialog processing engine 120 includes STT ("speech to text") module 122, TTS ("text to speech") module 124, and NLP ("natural language processing") module 126. In some implementations, one or more of the engines and/or modules of dialog processing engine 120 may be omitted, combined, and/or implemented in a component that is separate from CAPTCHA assistant 110. Also, in some implementations dialog processing engine 120 can include additional and/or alternative engines and/or modules. Further, as mentioned above, each of the engines and/or modules of CAPTCHA assistant 110 can be implemented in whole or in part at a client device, in whole or in part on one or more remote server device(s), and/or by one or more components of remote entity 160.

In some implementations, the dialog processing engine 120 processes audio data over one or more trained acoustic models to generate one or more semantic representations of the audio data. The semantic representation(s) can include, for example, phonemes, and/or text. Dialog processing engine 120 may include a STT 122 module that can generate text based on phonemes generated directly based on processing using a trained acoustic model. A trained acoustic model can be, in some implementations, a neural network model that may include or be part of a pipeline that includes, for instance, one or more long short-term memory (LSTM) layers, and trained based on a large corpus of audio data.

The CAPTCHA assistant 110 can utilize semantic representation(s) generated by one or more components of the dialog processing engine 120 in generating responsive output from the CAPTCHA assistant 110. For example, where audio data captures a spoken utterance of a user received from a client device, STT module 122 can generate a text representation of the spoken utterance, and the CAPTCHA assistant 110 can generate responsive audible and/or graphical output to provide to, for example, the remote entity 160 that is responsive to the spoken utterance, and that is determined based on the spoken utterance. CAPTCHA assistant 110 can then cause the responsive output to be rendered (e.g., audibly and/or graphically) at a client device and/or the remote entity 160. In some implementations, the responsive output can include textual data and the TTS module 124 converts textual data (e.g., natural language responses formulated by CAPTCHA assistant 110) into computer-generated audio data. The computer-generated audio data can then be rendered via one or more speakers of the remote entity 160.

NLP module 126 (alternatively referred to as a "natural language understanding engine") of CAPTCHA assistant 110 processes free-form natural language input and generates, based on the natural language input, annotated output for use by one or more other components of the CAPTCHA assistant 110. For example, the natural language processor 126 can process natural language free-form input that is textual input that is a conversion of audio data provided by a user via a client device. The generated annotated output may include one or more annotations of the natural language input and optionally one or more (e.g., all) of the terms of the natural language input.

In some implementations, the natural language processor 126 is configured to identify and annotate various types of grammatical information in natural language input. For example, the natural language processor 126 may include a part of speech tagger (not depicted) configured to annotate terms with their grammatical roles. Also, for example, in some implementations the natural language processor 126 may additionally and/or alternatively include a dependency parser (not depicted) configured to determine syntactic relationships between terms in natural language input.

In some implementations, the natural language processor 126 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 126 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 126 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 126 may rely on annotations from one or more other components of the dialog processing engine 120. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, the natural language processor 126 may use related prior input and/or other related data outside of the particular natural language input to determine one or more annotations.

CAPTCHA assistant 110 further includes a first generative adversarial network A-GAN (also referred herein as "Answer-GAN") 130. The A-GAN includes an A-Generator (or Answer-Generator) 132 and an A-Discriminator (or Answer-Discriminator) 134. The A-Generator 132 generates synthetic audio data, e.g., based on human generated audio data, and the synthetic audio data and the human (or "real") audio data may be provided to the A-Discriminator 134, which determines whether the audio data is real or synthetic. The A-Generator 132 and the A-Discriminator 134 may each be, for example, a neural network (e.g., feed-forward, recurrent, convolutional, etc.) and/or one or more other machine learning models.

Figure 2:
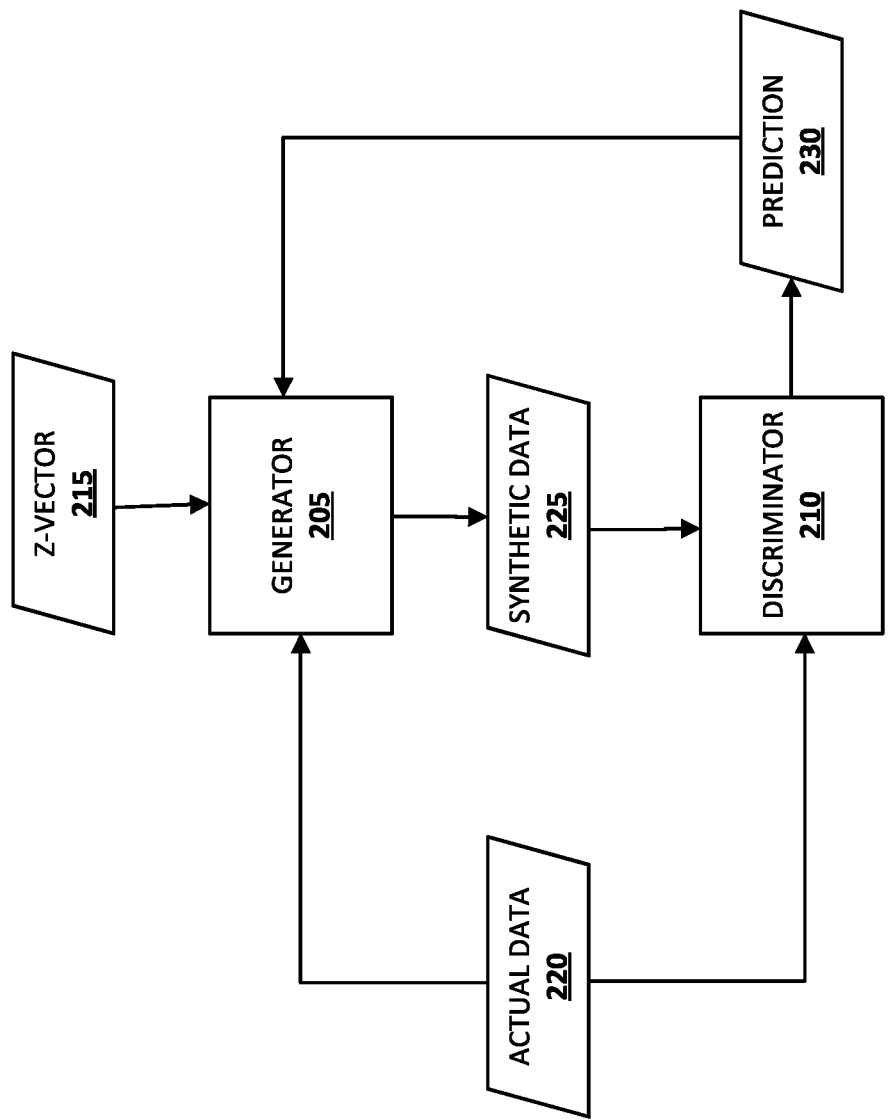
FIG. 2 illustrates an example of a generative adversarial network (GAN).

Referring to FIG. 2, a generic GAN is illustrated. The generator 205 receives actual (e.g., ground truth) data 220, such as from a database of data that was identified from one or more audio conversations between humans and/or between a human and an automated assistant. The generator 205 then utilizes a noise vector (also referred herein as a "Z-Vector") 215 to alter the actual data 220, such as human voice data, into synthetic data 225. The synthetic data is labelled as "synthetic" and provided to the discriminator 210. Further, the actual data 220 is labelled as "real" or "human-generated" and provided to the discriminator 210. The discriminator 210 then determines, for each dataset, a prediction 230 of whether a given input is computer-generated (i.e., synthetic) or human-generated (i.e., real).

During training, the predictions 230 may be compared to the labels to determine errors. Based on these errors, the discriminator 210 is trained to better predict subsequent datasets and the generator 205 is trained to better generate subsequent synthetic data 225 to increase the likelihood that the subsequently generated synthetic data 225 will fool the discriminator 210. Thus, once trained, the generator 205 is optimized to generate synthetic data that the discriminator 210 is unlikely going to be able to predict with confidence as being human- or computer-generated. Further, once trained, the discriminator 210 is optimized to increase likelihood that actual (human-generated) data 220 will be discerned from synthetic data 225.

In some implementations, a prediction 230 generated by discriminator 210 may be a binary value. For example, for a given input, discriminator 210 may determine that the input was either real or synthetic. In some implementations, discriminator 210 may generate a prediction that includes a confidence level that a given input is real or synthetic. For example, for a given input, discriminator 210 may determine that the input is real with a confidence level of 0.4 and synthetic with a confidence level of 0.6. These confidence levels may be indicative of a likelihood of 60% that the data is synthetic, and a likelihood of 40% that the data is real.

Referring again to FIG. 1, human answer database 135 includes actual human answers to questions that may be identified from conversations between humans and/or conversations between a human and a known automated assistant. The answers stored in the human answer database 135 may be received from one or more client devices and/or may be text of human answers received by dialog processing engine 120. For example, a human may interact with an automated assistant (e.g., 110) and the automated assistant may generate a dialog with the human. The automated assistant can provide prompts, such as questions, to the human, and the human may respond to the questions. The human answers may then be stored in the human answer database 135 to be utilized as training data for the A-GAN 130.

As an example, the CAPTCHA assistant 100 may allow a user to interact with one or more third party agents (which can be human or implemented with software), such as a weather agent that provides weather information to a user, a restaurant reservation agent that allows a user to make reservations at restaurants, and/or one or more other agents that allow a user of a client device to interact with one or more other entities. When a client device captures a spoken utterance of a user, the dialog processing engine 120 may process the audio data into text, determine an agent that can consume the audio data, and facilitate a dialog between an agent and the user. In some instances, responses of the user may be stored in human answer database 135 to be utilized by A-GAN 130 as training data by the A-Generator 132.

In some implementations, remote entity 160 may be an agent that a user may interact with via an automated assistant, such as CAPTCHA assistant 110. In some instances, remote entity 160 may be a human. For example, a user may have interest in scheduling an appointment at a beauty salon and provide audio data to CAPTCHA assistant 110 instructing the assistant to make the reservation (e.g., "Please schedule me a hair appointment at XYZ salon for tomorrow at 1 pm.") Instead of initiating a dialog with an agent, CAPTCHA assistant 110 may instead contact the beauty salon directly, such as via telephone and/or other audio communication channel. The CAPTCHA assistant 110 may then provide audio prompts to the remote entity 160 (e.g., "I would like to make an appointment for Mrs. Smith tomorrow. Is 1 p.m. available?"). The remote entity 160 may then respond to the CAPTCHA assistant 100 (e.g., "Sorry, 1 p.m. is not available. How about 11 a.m.?"). The dialog may continue between the CAPTCHA assistant 110 and remote entity 160 until the reservation has been completed and/or until additional input is required from the user. Or, the situation could be reversed. CAPTCHA assistant 110 may be deployed to fulfill incoming requests, e.g., to procure goods or services (e.g., make dinner reservations, hair cut appointments, etc.).

In either case, remote entity 160 may not be a human but may instead be an automated entity mimicking a human. The automated entity may be, for example, a malicious spam bot. Thus, when the CAPTCHA assistant 110 is interacting with a malicious entity and not an expected human, computing time and resources are wasted in communicating with an entity that a user has no interest in receiving information and/or services. Further, a malicious entity may solicit information from a user to utilize for unwanted purposes. Thus, a user has interest in minimizing the risk of interacting with non-human remote entities when a human is expected.

Figure 3:
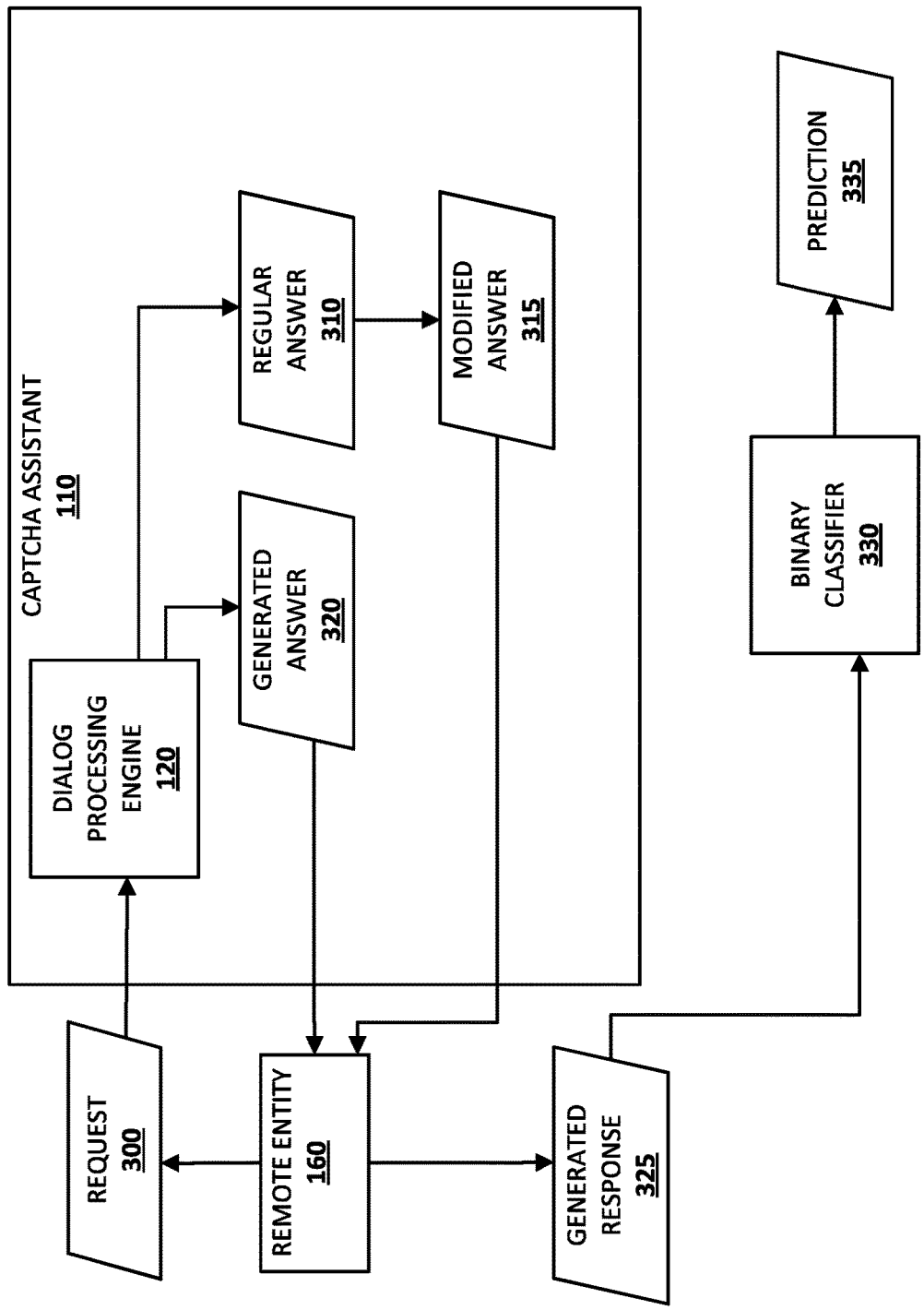
FIG. 3 illustrates a flowchart of various methods for implementation of a CAPTCHA assistant.

Referring to FIG. 3, a flowchart of various methods for implementation of a CAPTCHA assistant is illustrated. A request 300 is received from a potentially malicious entity. The request 300 is provided to dialog processing engine 120 of the CAPTCHA assistant 110. Once the request 300 is received, an answer is generated. The answer may be an answer to the request 300 and may be generated by, for example, A-GAN 130. Two possible approaches for answer generation are depicted in FIG. 3. In a first approach, a "regular" answer 310 may be generated by an automated assistant in response to the request 300. A "regular" answer may be, for instance, responsive to the request 300, and may not be intended to "fool" a bot for CAPTCHA purposes. A "modified" answer 315 may then be generated based on the "regular" answer 310 and provided to the potentially malicious entity. In a second approach, a generated answer 320 may instead be entirely generated by the automated assistant (i.e., not a modified version of a regular answer but instead based on one or more previous answers, other human answers from previous sessions, and/or other sources of possible answers).

The modified answer 315 or the wholly-generated answer 320 may be provided to the remote entity 160. In response to providing the answer (either a modified answer 315 or a generated answer 320), a response 325 from the potentially malicious remote entity 160 is received. The response 325 is provided to a trained classifier (e.g., 330), which predicts (335) whether the response 325 is from a human or from an automated entity. Based on the prediction 335, one or more other components then determines whether to continue the conversation (in the case that the binary classifier 330 determines that the potentially malicious entity is human) or end the conversation (in the case that binary classifier 330 determines that the potentially malicious entity is providing computer generated responses).

Referring again to FIG. 1, CAPTCHA assistant 110 includes a challenge engine 140. The challenge engine 140 can generate challenge questions that may be utilized by the A-GAN 130 to provide to a remote entity 160. In some implementations, challenge engine 140 may be a generative adversarial network (hereinafter referred to as the challenge-GAN, or C-GAN), which is comprised of a generator and a discriminator (hereinafter referred to as the challenge-generator, or C-Generator, and the challenge-discriminator, or C-Discriminator). The challenge engine 140 can generate challenge questions to provide to a potentially malicious entity, such as the remote entity 160, and the A-Discriminator 134, once trained, can determine whether answers provided by the remote entity 160 are provided by a human or are computer-generated.

In some implementations, the challenge engine 140 can provide challenge questions to a trusted entity, either a known human entity or a known computer entity, and answers received from the trusted entity may be provided to the A-Discriminator as training data. Further, the responses received from the trusted entity can be provided to the C-Discriminator and utilized to train the C-Generator to improve challenge questions (i.e., optimize the C-Generator to generate challenge questions that are less discernible as originating from a human than a computer). In some implementations, the C-Discriminator may not be present, and both the C-Generator and the A-Generator may be trained based on the decisions of the A-Discriminator. For example, C-Generator may generate a challenge question to provide to a known entity. The answer from the known entity may be provided to the A-Discriminator to decide whether the known entity is human or a computer, and the result may be provided to the C-Generator to improve future generated challenge questions (i.e., questions more likely to generate answers that elicit a response that improves the functioning of the A-Discriminator to determine whether the response is human or computer).

Figure 4:
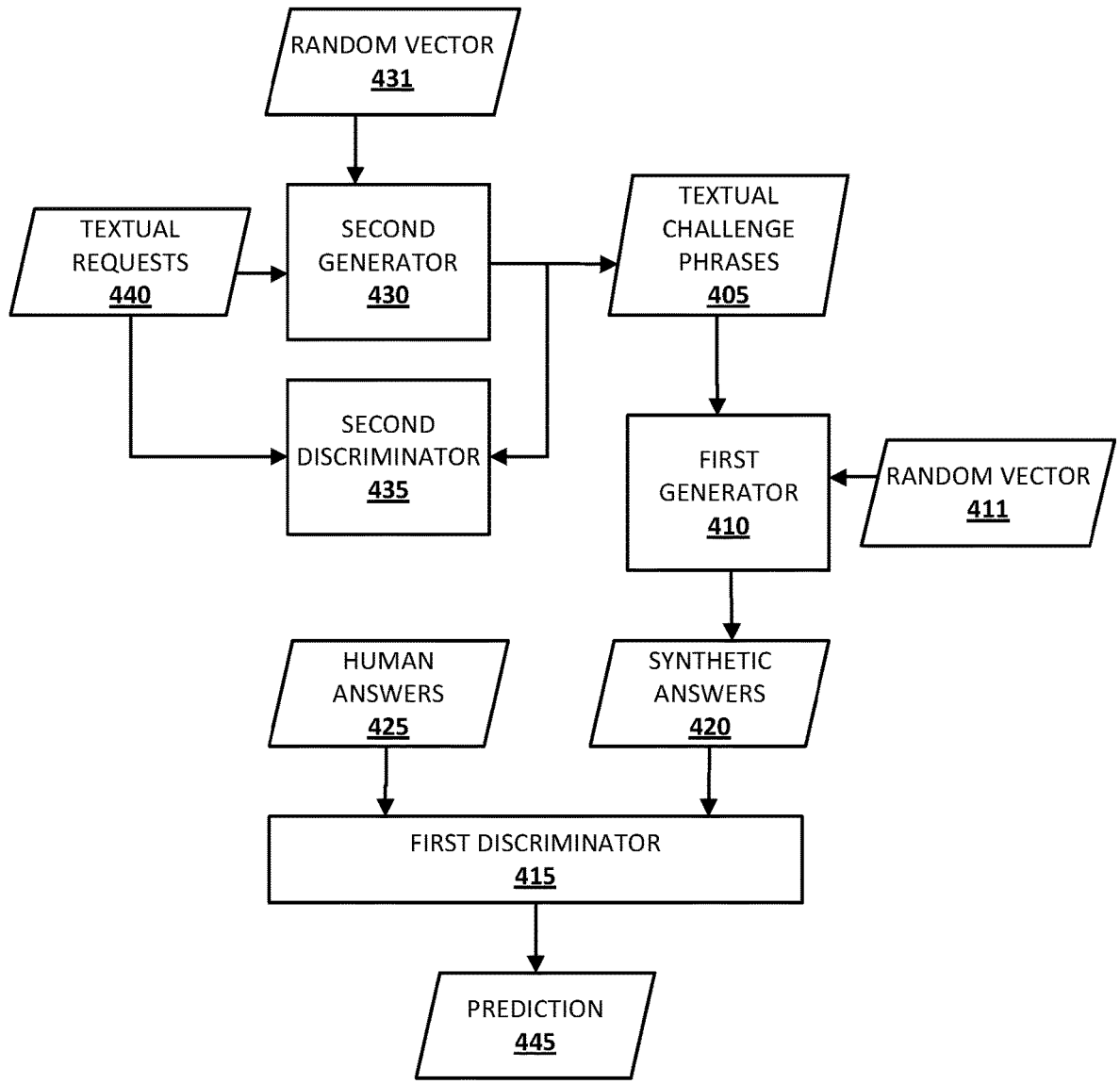
FIG. 4 illustrates an example of training a CAPTCHA assistant according to implementations described herein.

Referring to FIG. 4, an example of training a CAPTCHA assistant 110 comprised of two GANS is provided. As illustrated, textual challenge phrases 405 are provided to a first generator 410. The first generator may share one or more characteristics with the A-Generator 132 of FIG. 1. The first generator 410 generates synthetic answers 420 to the textual challenge phrases 405. For example, a challenge phrase of "Would you like pepperoni on that?" may be provided to the first generator 410, and the first generator 410 may determine an answer of "No, I would not. Thank you" as a synthetic answer 420.

In some implementations, a synthetic answer 420 may be based on an actual conversation between a human and a known and trusted assistant. For example, for the previous example, the first generator 410 may identify a previous conversation between a human and an automated assistant in communication with a pizza restaurant. The conversation and/or the human answers may be stored in human answer database 135 as a human answer 425. In some implementations, the first generator 410 may alter one or more portions of a previous conversation between a human and another entity (either human or a trusted automated assistant) to generate a synthetic answer. For example, the first generator 410 may identify an answer of "No, I would not. Thank you" from the human answer database 135 and alter the answer to a synthetic answer of "Yes, I would not. Thank you." In some implementations, the first generator 410 may alter a known human answer into a synthetic answer based on input from a random vector (or "Z-vector") 411. The random vector 411 may provide one or more random words, phonemes, and/or substitutions for words that the first generator 410 may utilize to alter a human answer into a synthetic answer.

The synthetic answers 420 are labeled as synthetic and provided to the first discriminator 415, along with human answers 425 that are labelled as originating from a human. The first discriminator 415 may share one or more characteristics with the A-Discriminator 134 of FIG. 1. The first discriminator 415 then determines whether an answer originated from a human or is a synthetic answer that was generated by the first generator 410. In some implementations, the first discriminator 415 may be provided the challenge phrases along with the human answers 425 and the synthetic answers 420 so that context may be determined for the provided answers. For example, an answer of "Bacon, sausage, and mushrooms" may be an appropriate answer (either from a human or a computer) for the challenge phrase "What would you like on your pizza?" but the same answer may not be appropriate as a response to a challenge phrase of "What time you like to make a hair appointment?" Thus, first discriminator 415 may determine whether a particular answer is from a human or not based on whether, for example, the answer is a valid response to the challenge phrase.

First discriminator 415 provides a CAPTCHA output 445, which can be a prediction of whether, for a given answer, the answer is from a human or computer-generated (i.e., from the first generator 410). In some implementations, the CAPTCHA outputs 445 may be a binary value that indicates, for a given output, whether the answer was human or computer-generated. In some implementations, the CAPTCHA outputs 445 may be a range of values, a probability, and/or one or more other values for both human and computer-generated that indicate a likelihood that an answer was human or computer-generated. For example, the first discriminator may receive a synthetic answer of "Yes, I would not. Thank you" and determine that the answer does not make grammatical sense and/or includes one or more paradoxical terms; in this case, affirming and denying something at the same time. First discriminator 415 may provide an output of "synthetic" indicating a guess that the answer is from the first generator 410. Alternatively, first discriminator 415 may provide a CAPTCHA output that indicates that the answer is from a human with a confidence level of 0.75 and synthetic with a confidence level of 0.25, indicating a 75% likelihood that the answer was from a human and a 25% likelihood that the answer was from the first generator 410.

Once the first discriminator 415 has determined a CAPTCHA output 445, the CAPTCHA output may be utilized to train both the first generator 410 and the first discriminator 415. For example, if the first discriminator 415 determines a CAPTCHA output of "human" for an answer that is labelled as synthetic, the machine learning model of the first discriminator 415 may be trained (e.g., using techniques such as back propagation and/or stochastic or batch gradient descent) to improve subsequent determinations (i.e., optimize to prevent the same incorrect output for subsequent answers). Also, for example, if the first discriminator 415 determines a CAPTCHA output 445 of "human" for an answer that is labelled as originating from a human, the machine learning model of the first generator 410 may be trained to make future synthetic answers less likely to be identified as "human" by the first discriminator 415. Thus, the training of the GAN optimizes the first generator 410 to provide answers that are more difficult for the first discriminator 415 to discern between human and computer-generated and further optimizes that first discriminator 415 to improve CAPTCHA outputs 445 as the quality of the synthetic answers is improved.

In some implementations, the first generator 410 may further identify an entity type with training data. For example, the first discriminator 415 may be trained to discern between human and computer-generated answers and challenge phrases that may be provided to a particular type of entity. For example, a remote entity may be a "beauty salon" and an answer of "Yes, please" to a provided request of "Would you like anchovies on that?" would more likely be determined by the first discriminator 415 to be from a computer-generated entity than if the same answer was provided in response to the same request if the entity was a "pizza restaurant." Thus, in addition to an answer, the entity type may be provided as training data to help train the first discriminator 415 to discern between human and computer-generated answers.

In some implementations, first generator 410 may identify textual challenge phrases 405 from one or more databases that include phrases provided to humans and/or phrases provided to known automated assistants. In some implementations, first generator 410 may identify textual challenge phrases 405 based on forms of challenge phrases that are of a form that is common in requests that have been previously provided to humans and/or to automated assistants. For example, the request of "What time would you like?" may be commonly provided to remote entities and may be identified as a challenge phrase to utilize in training the GAN.

In some implementations, textual challenge phrases 405 may be determined by a second GAN that includes a second generator 430 and a second discriminator 435. The second generator 430 receives textual requests 440 and generates possible textual challenge phrases 405 based on the textual requests 440. In some implementations, the textual requests 440 may be based on identified requests provided to a human by another human and/or by a known automated assistant. In some implementations, the textual requests 440 may be a pattern of common requests provided to a human and/or a known automated assistant. For example, second generator 430 may identify a plurality of requests of the form "What time would you like to [event]?" and generate a textual challenge question of "What time would you like to have dinner?" The second generator 430 may generate textual challenge questions based on textual requests 440 and a random vector 431 that shares one or more characteristics with random vector 411. Put another way, the second generator may be "conditioned" using random vector 431. For example, random vector 431 may provide a random event, such as "hair appointment" to second generator 430, and second generator 430 may replace "[event]" in a textual request pattern to generate a textual challenge phrase of "What time would you like to make your hair appointment?" In some implementations, other components, such as A-discriminator 134, may also be conditioned on random vector 431 and/or other data, such as output generated by a generator of challenge engine 140.

In some implementations, the second discriminator 435 can determine whether a generated textual challenge phrase is likely to be a textual request (i.e., from a human) or generated by the second generator 430. For example, a textual request 440 of "Would you like pepperoni on that?" may result in the second generator 430 generating a textual challenge question 405 of "Would you like a hair appointment on that?" which is unlikely to have a valid meaning. Second discriminator 435 may be provided both the textual request (labelled as such) and the textual challenge phrase (labelled as such). Second discriminator may then determine that the textual challenge phrase is likely to be identifiable as being computer generated and the textual challenge phrase of "Would you like a hair appointment on that?" may not be provided to the first generator 410 as a textual challenge phrase 405.

In some implementations, second discriminator 435 may determine whether a particular textual challenge phrase 405 resulted in assisting the first discriminator 415 in differentiating between human answers and computer-generated answers. For example, when first discriminator 415 determines an output 445, the result may be provided to second discriminator 435 in addition to the textual challenge phrase that was provided to generate the output. Thus, in these implementations, second generator 430 may be trained to improve the textual challenge phrases it generates. In some implementations, second discriminator 435 may be omitted and both the first generator 410 and the second generator 430 may be trained based on the CAPTCHA outputs 445 of the first discriminator 415.

Figure 5:
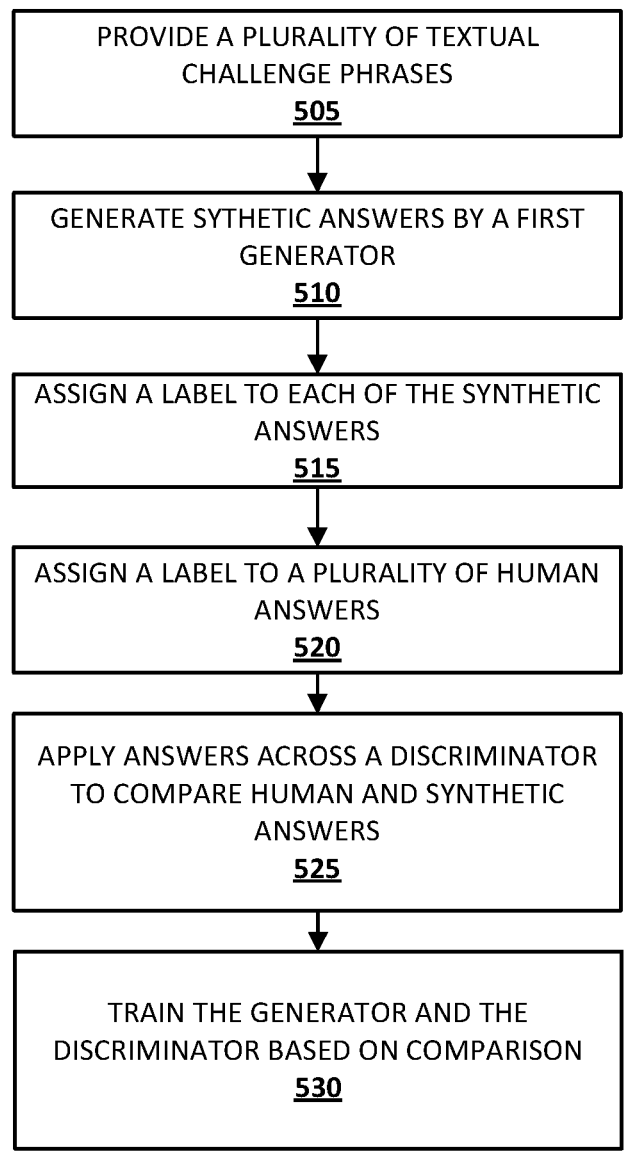
FIG. 5 illustrates a flowchart of an example method for training a CAPTCHA assistant according to implementations described herein.

FIG. 5 illustrates a flowchart of an example method for training a CAPTCHA assistant according to implementations described herein. The steps of FIG. 5 can be performed by one or more processors, such as one or more processors of a client device. Other implementations may include additional steps than those illustrated in FIG. 5, may perform step(s) of FIG. 5 in a different order and/or in parallel, and/or may omit one or more of the steps of FIG. 5.

At step 505, a plurality of textual challenge phrases is provided. Each of the textual challenge phrases includes a challenge configured to elicit a response from a natural dialog software agent. In some implementations, the plurality of textual challenge phrases may be generated based on actual phrases provided to a known remote entity, such as a trusted automated assistant. In some implementations, the textual challenge phrases may be generated based on dialogs between humans and/or between a human and a trusted automated assistant. In some implementations, the textual challenge phrases may be generated by providing actual requests to a challenge engine that shares one or more characteristics with challenge engine 140. For example, actual requests may be provided to a generative adversarial network that generates challenge phrases based on actual requests in dialogs between humans and/or between a human and a known automated assistant.

At step 510, synthetic answers are generated by providing the textual challenge phrases to a first generator. The first generator may share one or more characteristics with the A-Generator 132 of FIG. 1. In some implementations, the first generator may be a neural network that is optimized to generate answers that are indistinguishable from human answers. For example, the first generator can be a generator of a generative adversarial network that is trained based on output from a first discriminator.

At step 515, a label is assigned to each of the synthetic answer. The label may be any indication that distinguishes the synthetic answers from human answers. In some implementations, the labels may include an indication that the answer is "synthetic," "computer-generated," and/or "modified" to differentiate the synthetic answers from human answers.

At step 520, labels are assigned to a plurality of human answers. The human answers may be stored in a database that shares one or more characteristics with human answer database 135. For example, the human answers may be identified from actual dialogs between humans and/or between a human and a dialog software agent, such as a known and/or trusted automated assistant. In some implementations, the human answers may be labeled as "human," "real," and/or any other label to distinguish the human answers from the synthetic answers when providing the answers to the first discriminator, as described in step 525.

At step 525, the human answers and the synthetic answers are applied as input across a first discriminator to generate a prediction of whether each answer is human or computer-generated. In some implementations, the first discriminator can share one or more characteristics with A-Discriminator 134. For example, for each answer, the first discriminator may predict whether the answer is human or computer-generated and/or may provide one or more confidence levels for each answer indicating likelihood that the answer is human and/or computer-generated.

At step 530, the first generator and the first discriminator are trained based on comparison(s) of the predictions of the first discriminator with the labels. For example, if the first discriminator correctly identifies an answer as a synthetic answer, the machine learning model of the first generator may be trained to improve subsequent synthetic answers (i.e., generate subsequent answers that are more difficult to discern between human and computer-generated). Further, if the first discriminator incorrectly identifies an answer, the machine learning model of the first discriminator may be trained to prevent the same misidentification from occurring upon subsequent answers being provided by the generator.

Figure 6:
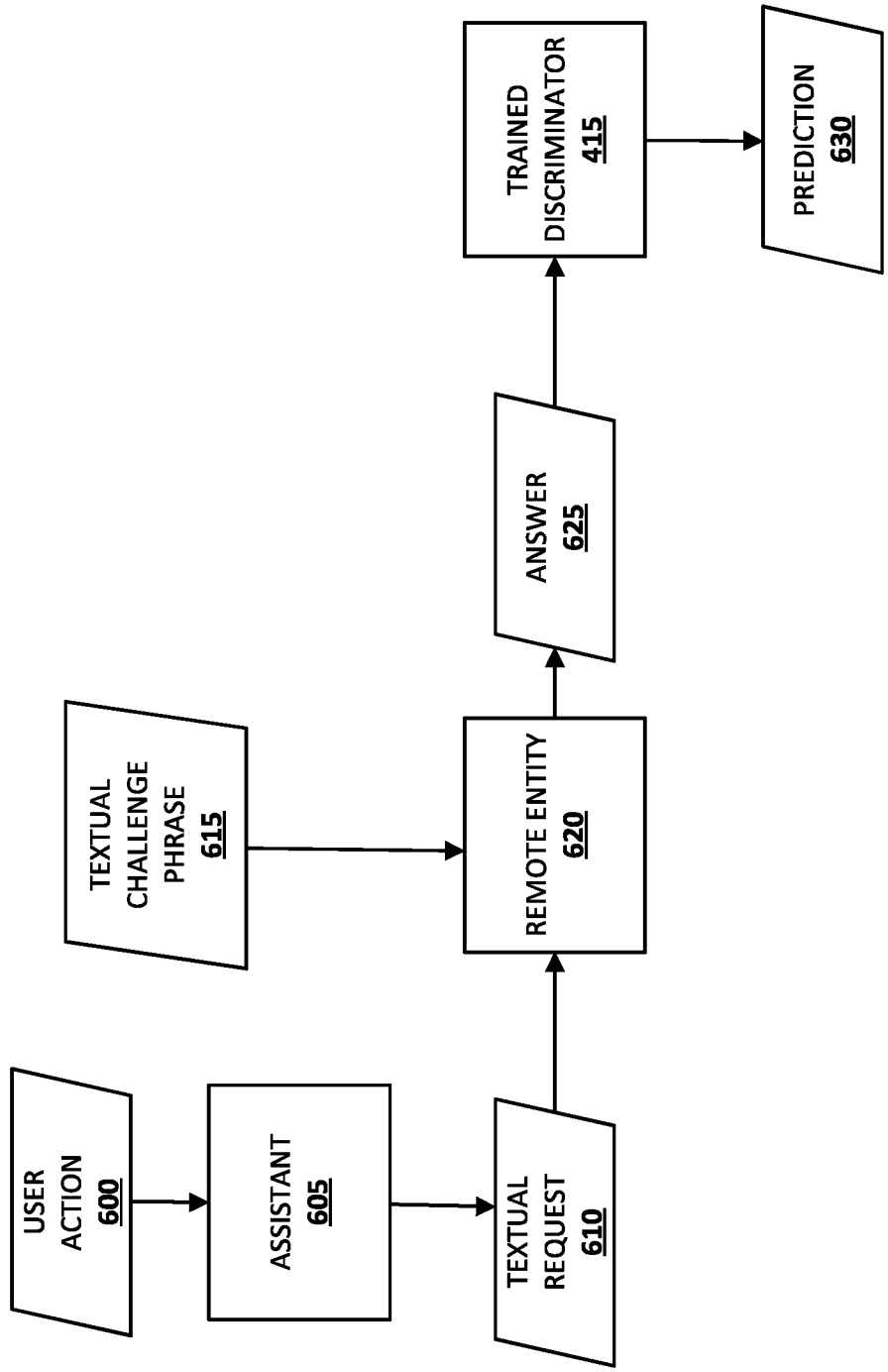
FIG. 6 illustrates an example of utilizing a trained CAPTCHA assistant according to implementations disclosed herein.

FIG. 6 illustrates an example of utilizing a trained CAPTCHA assistant according to implementations disclosed herein. The flowchart illustrates a method by which a trained discriminator 415 (i.e., the first discriminator of FIG. 4) may be utilized to determine whether a remote entity 620 is a human, as expected, or a computer generating responses. In some implementations, a user action 600 is received by an assistant, such as the CAPTCHA assistant 110 of FIG. 1, and processed as previously described to generate a textual request 610. In some implementations, the textual request 610 may be directly provided to a remote entity 620. In some implementations, the textual request 610 may be provided to a challenge generator, such as second generator 430 of FIG. 4, and the generated textual challenge phrase may be provided to the remote entity 620. In some implementations, a textual challenge phrase 615 may be provided to the remote entity 620 independent of a user action 600. For example, the CAPTCHA assistant 110 may identify a remote entity 620 and provide a textual challenge question that can assist the trained discriminator 415 in making a prediction. Thus, in some implementations, the trained discriminator 415 may be utilized separate from the flow of requests to remote entities and in some implementations, the trained discriminator may be utilized while actual requests are provided to the remote entity 620.

The remote entity 620 provides an answer in response to being provided the textual request 610 and/or textual challenge phrase 615. The answer 625 is then provided to the trained discriminator 415 to determine whether the answer 625 is from a human or computer-generated. The trained discriminator 415 makes a prediction 630 in a similar manner as described herein with respect to the first discriminator 415 of FIG. 4. In some implementations, the prediction 630 of the trained discriminator 415 may be utilized as training data to refine the machine learning model of the first generator 410. For example, one or more components can determine that the trained discriminator 415 correctly classified the source of the answer 625 and provide the answer 625, the textual challenge phrase 615, and/or other data to the answer-generator to refine the generator.

Referring again to FIG. 1, the CAPTCHA assistant 110 further includes a decision engine 150. The decision engine 150 determines an action based on the prediction of the A-Discriminator 134. In some implementations, the decision engine 150 may flag a remote entity 160 as malicious based on receiving a prediction from the A-Discriminator 134 that the remote entity 160 is not human. Similarly, the decision engine 150 may flag a remote entity 160 as a trusted entity based upon receiving a prediction from the A-Discriminator 134 that the remote entity 160 is human, as expected. In some implementations, decision engine 150 may flag remote entities as human or computer-generated only when the confidence level of the prediction satisfies a threshold. For example, A-Discriminator 134 may determine that a remote entity is 50% likely to be a human and 50% likely to be computer-generated, and decision engine 150 may not flag the remote entity 160 as either human or computer-generated. In some implementations, decision engine 150 may provide an indication to one or more other components that a remote entity 160 cannot be flagged and the remote entity 160 may be tested with additional textual challenge phrases and/or tested by a human to determine with better certainty whether the remote entity 160 is human or a potentially malicious bot.

Figure 7:
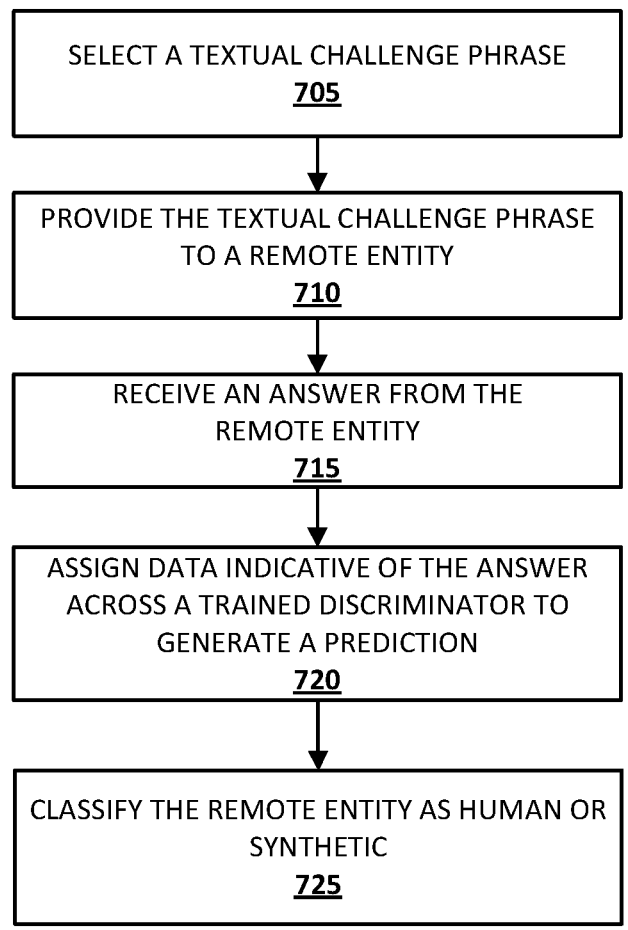
FIG. 7 a flowchart of an example method for utilizing a trained CAPTCHA assistant according to implementations disclosed herein.

FIG. 7 a flowchart of an example method for utilizing a trained CAPTCHA assistant according to implementations disclosed herein. The steps of FIG. 7 can be performed by one or more processors, such as one or more processors of a client device. Other implementations may include additional steps than those illustrated in FIG. 7, may perform step(s) of FIG. 7 in a different order and/or in parallel, and/or may omit one or more of the steps of FIG. 7.

At step 705, a textual challenge phrase is selected. In some implementations, the selected textual challenge phrase may be generated by a challenge engine that shares one or more characteristics with challenge engine 140. For example, the textual challenge phrase may be generated by a challenge generator that is trained alongside a challenge discriminator in a GAN configuration, as described herein. In some implementations, a textual challenge phrase may be generated based on actual phrases provided by a human and/or an automated assistant in a dialog. For example, a human and a known automated assistant may engage in a conversation, and one or more of the textual requests of the user may be provided to the remote entity as a challenge phrase. In some implementations, a textual request of a human user may be selected and provided to a remote entity as a textual challenge phrase without modification.

At step 710, the textual challenge phrase is provided to a remote entity. The remote entity may share one or more characteristics with remote entity 160. For example, the remote entity may be a suspected malicious entity that is computer-generated but is expected to be a human. The textual challenge phrase may be provided to the suspected malicious entity to elicit an answer that may allow a trained discriminator to determine whether the answer originated from a human or is computer-generated.

At step 715, an answer is received from the remote entity. In some implementations, the answer may be audio data and one or more components, such as the dialog processing engine 120 of FIG. 1, may convert the answer into a textual answer. In some implementations, the answer may be a textual answer.

At step 720, the answer is provided to a trained discriminator, such as the A-Discriminator 134 of FIG. 1. The discriminator may be trained according to methods described herein and further illustrated in FIG. 5. For example, the discriminator may be a component of a GAN and may be trained based on textual challenge phrases provided to an answer generator as well as answers generated by the answer generator. The discriminator generates output indicative of whether the remote entity is likely human or a natural language software agent. For example, the discriminator may provide a binary classification (e.g., human or computer-generated) and/or the discriminator may provide confidence levels for the answer being human versus computer-generated, as described herein.

At step 725, the remote entity is classified based on the prediction of the discriminator. For example, if the discriminator determines that the remote entity is human, the remote entity may be classified as a valid entity for subsequent conversations between humans and the entity and/or between an automated assistant and the entity. Also, for example, if the discriminator determines that the remote entity is an automated agent, such as a malicious entity, the remote entity may be classified as malicious to prevent subsequent dialogs between humans and the entity or between automated assistants and the entity.

Figure 8:
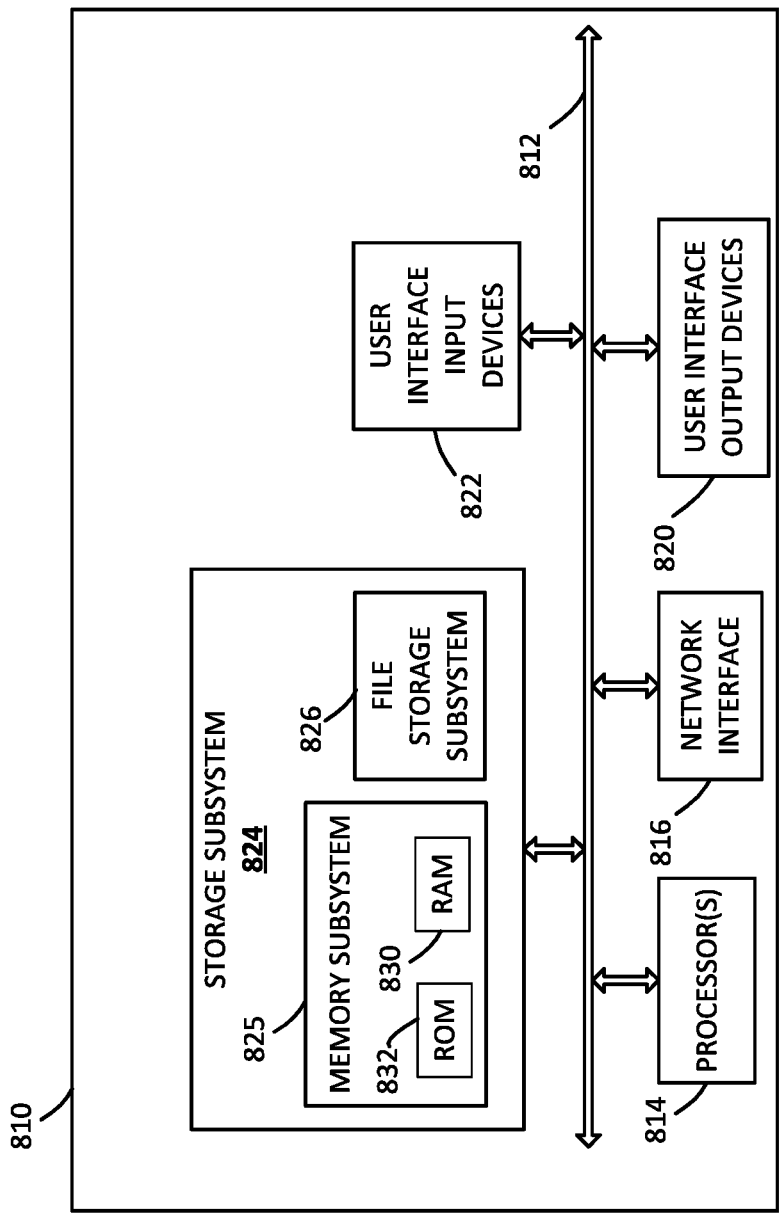
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods described herein, as well as to implement various components depicted in various figures.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for training a completely automated public Turing test ("CAPTCHA") using one or more processors, comprising:
applying a plurality of textual requests as input across a generator machine learning model to generate, respectively, a plurality of textual challenge phrases, wherein the plurality of textual requests are configured to elicit a textual challenge phrase from a natural language dialog software agent, and wherein each textual challenge phrase includes a challenge configured to elicit a response from the natural language dialog software agent;
applying the plurality of textual challenge phrases as inputs across an additional generator machine learning model to generate a respective plurality of synthetic answers, wherein each respective synthetic answer of the plurality of synthetic answers is responsive to the challenge included with the respective textual challenge phrase;
assigning each of the plurality of synthetic answers a label, wherein the label for a given synthetic answer is indicative of the given synthetic answer being generated by the natural language dialog software agent;
assigning each of a plurality of human-generated answers a label indicative of it being generated by a human;
applying a plurality of answers as inputs across a first discriminator machine learning model to generate a respective plurality of CAPTCHA outputs, wherein each respective CAPTCHA output of the plurality of CAPTCHA outputs comprises a prediction of whether the respective answer of the plurality of answers was generated by the natural language dialog software agent or a human, and wherein the plurality of answers comprises the plurality of synthetic answers and the plurality of human-generated answers; and
training the additional generator and first discriminator machine learning models based on a comparison of the labels assigned to the plurality of answers with the plurality of CAPTCHA outputs.

2. The method of claim 1, wherein the generator machine learning model is trained in conjunction with a second discriminator machine learning model, and wherein the second discriminator machine learning model is configured to have the plurality of textual requests applied as input to generate output.

3. The method of claim 1, wherein the additional generator machine learning model comprises a neural network.

4. The method of claim 1, wherein the first discriminator machine learning model comprises a neural network.

5. The method of claim 1, wherein the additional generator machine learning model is conditioned on a noise vector.

6. The method of claim 1, wherein the first discriminator machine learning model is conditioned on a noise vector.

7. At least one non-transitory computer-readable medium comprising instructions that, in response to execution of the instructions by one or more processors, cause the one or more processors to perform the following operations:
applying a plurality of textual requests as input across a generator machine learning model to generate, respectively, a plurality of textual challenge phrases, wherein the plurality of textual requests are configured to elicit a textual challenge phrase from a natural language dialog software agent, and wherein each textual challenge phrase includes a challenge configured to elicit a response from the natural language dialog software agent;
applying the plurality of textual challenge phrases as inputs across an additional generator machine learning model to generate a respective plurality of synthetic answers, wherein each respective synthetic answer of the plurality of synthetic answers is responsive to the challenge included with the respective textual challenge phrase;
assigning each of the plurality of synthetic answers a label indicative of it being generated by the natural language dialog software agent;
assigning each of the plurality of synthetic answers a label, wherein the label for a given synthetic answer is indicative of the given synthetic answer being generated by the natural language dialog software agent;
applying a plurality of answers as inputs across a first discriminator machine learning model to generate a respective plurality of CAPTCHA outputs, wherein each respective CAPTCHA output of the plurality of CAPTCHA outputs comprises a prediction of whether the respective answer of the plurality of answers was generated by the natural language dialog software agent or a human, and wherein the plurality of answers comprises the plurality of synthetic answers and the plurality of human-generated answers; and
training the additional generator and first discriminator machine learning models based on a comparison of the labels assigned to the plurality of answers with the plurality of CAPTCHA outputs.

8. The at least one non-transitory computer-readable medium of claim 7, wherein the generator machine learning model is trained in conjunction with a second discriminator machine learning model, and wherein the second discriminator machine learning model is configured to have the plurality of textual requests applied as input to generate output.

9. The at least one non-transitory computer-readable medium of claim 7, wherein the additional generator machine learning model comprises a neural network.

10. The at least one non-transitory computer-readable medium of claim 7, wherein the first discriminator machine learning model comprises a neural network.

11. The at least one non-transitory computer-readable medium of claim 7, wherein the additional generator machine learning model is conditioned on a noise vector.

12. The at least one non-transitory computer-readable medium of claim 7, wherein the first discriminator machine learning model is conditioned on a noise vector.

13. A system comprising one or more processors and memory operably coupled with the one or more processors, wherein the memory stores instructions that, in response to execution of the instructions by one or more processors, cause the one or more processors to perform the following operations:
applying a plurality of textual requests as input across a generator machine learning model to generate, respectively, a plurality of textual challenge phrases, wherein the plurality of textual requests are configured to elicit a textual challenge phrase from a natural language dialog software agent, and wherein each textual challenge phrase includes a challenge configured to elicit a response from the natural language dialog software agent;

applying the plurality of textual challenge phrases as inputs across an additional generator machine learning model to generate a respective plurality of synthetic answers, wherein each respective synthetic answer of the plurality of synthetic answers is responsive to the challenge included with the respective textual challenge phrase;

assigning each of the plurality of synthetic answers a label, wherein the label for a given synthetic answer is indicative of the given synthetic answer being generated by the natural language dialog software agent;

assigning each of a plurality of human-generated answers a label indicative of it being generated by a human;

applying a plurality of answers as inputs across a first discriminator machine learning model to generate a respective plurality of CAPTCHA outputs, wherein each respective CAPTCHA output of the plurality of CAPTCHA outputs comprises a prediction of whether the respective answer of the plurality of answers was generated by the natural language dialog software agent or a human, and wherein the plurality of answers comprises the plurality of synthetic answers and the plurality of human-generated answers; and training the additional generator and first discriminator machine learning models based on a comparison of the labels assigned to the plurality of answers with the plurality of CAPTCHA outputs.

14. The system of claim 13, wherein the generator machine learning model is trained in conjunction with a second discriminator machine learning model, and wherein the second discriminator machine learning model is configured to have the plurality of textual requests applied as input to generate output.

15. The system of claim 13, wherein the additional generator machine learning model comprises a neural network.

16. The system of claim 13, wherein the first discriminator machine learning model comprises a neural network.

17. The system of claim 13, wherein the additional generator machine learning model is conditioned on a noise vector.

* * * * *